Dec. 14, 1954 M. VANZO 2,696,866
MACHINE FOR BUTT-SPLICING TWO CRUDE RUBBER TUBE ENDS
Filed May 11, 1951 10 Sheets-Sheet 1

Inventor
MARCELLO VANZO
By Toulmin & Toulmin
Attorneys

Dec. 14, 1954 M. VANZO 2,696,866
MACHINE FOR BUTT-SPLICING TWO CRUDE RUBBER TUBE ENDS
Filed May 11, 1951 10 Sheets-Sheet 2

Inventor
MARCELLO VANZO
By Toulmin & Toulmin
Attorneys

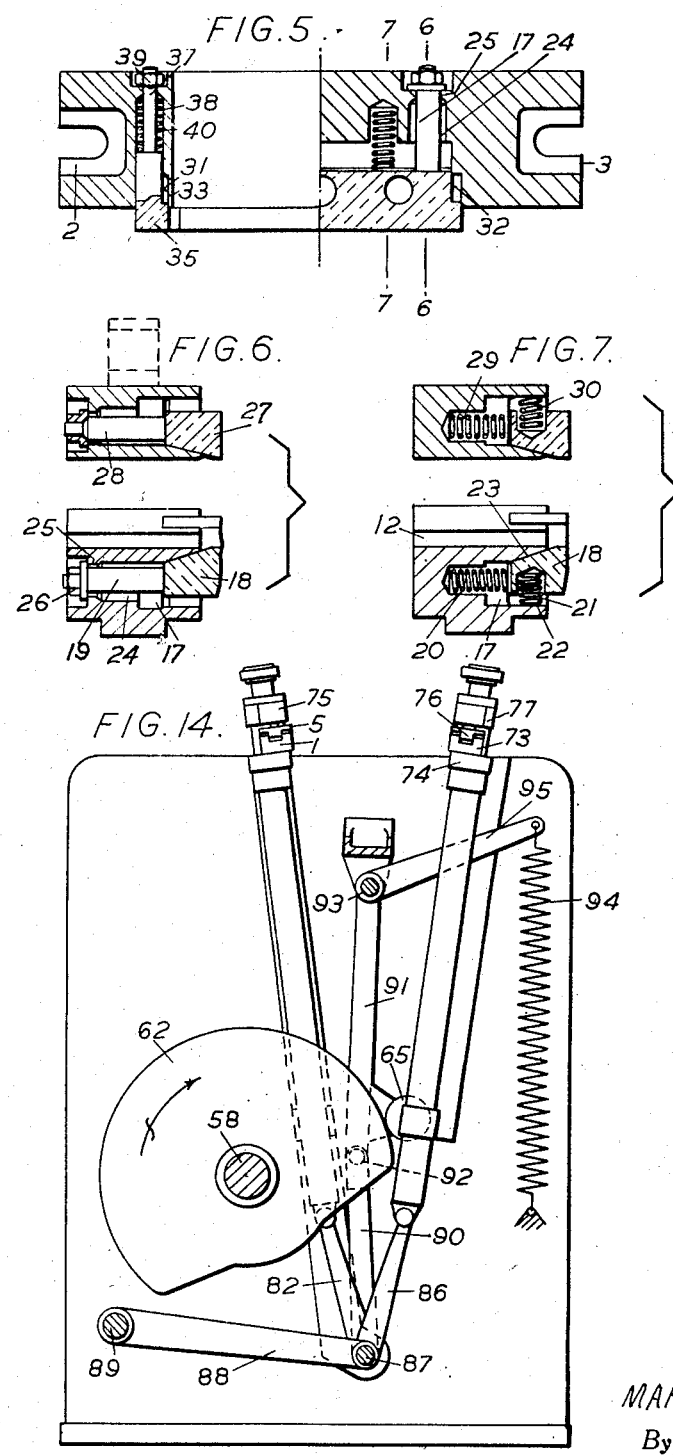

Dec. 14, 1954 M. VANZO 2,696,866
MACHINE FOR BUTT-SPLICING TWO CRUDE RUBBER TUBE ENDS
Filed May 11, 1951 10 Sheets-Sheet 4
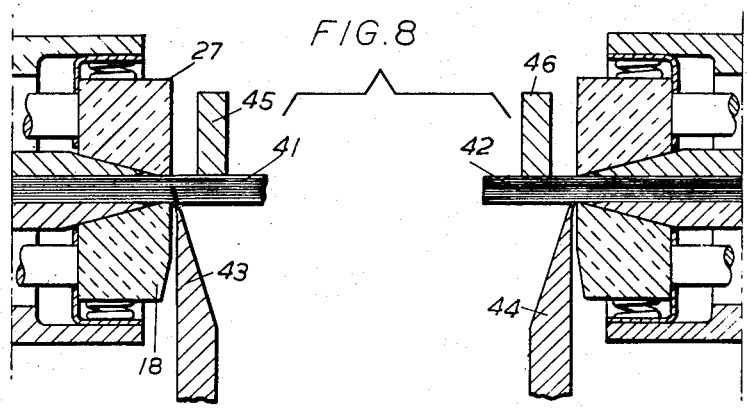
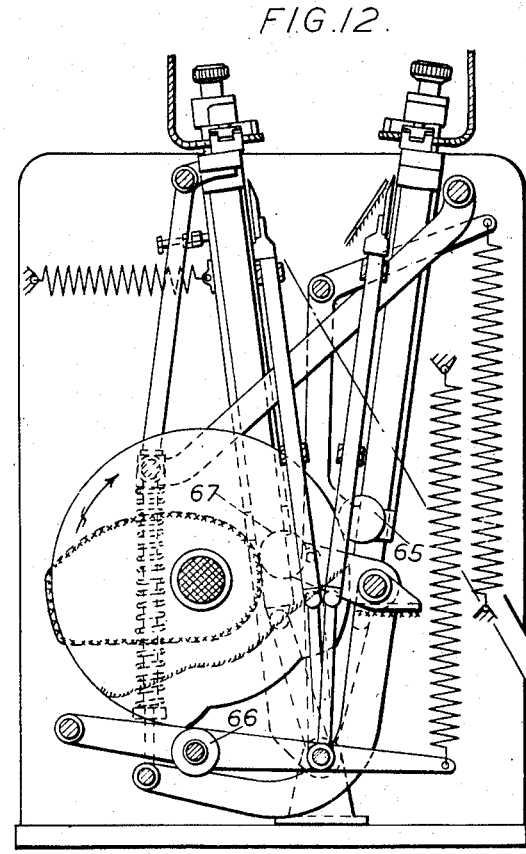
Inventor
MARCELLO VANZO Dec. 14, 1954 M. VANZO 2,696,866
MACHINE FOR BUTT-SPLICING TWO CRUDE RUBBER TUBE ENDS
Filed May 11, 1951 10 Sheets-Sheet 5
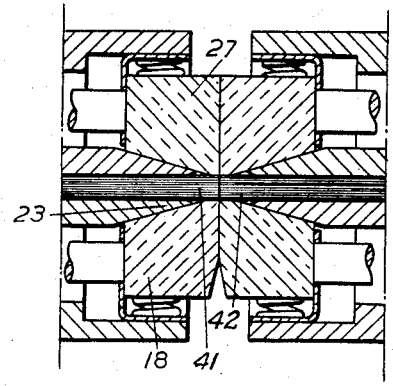
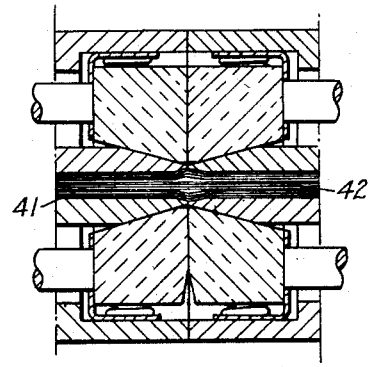
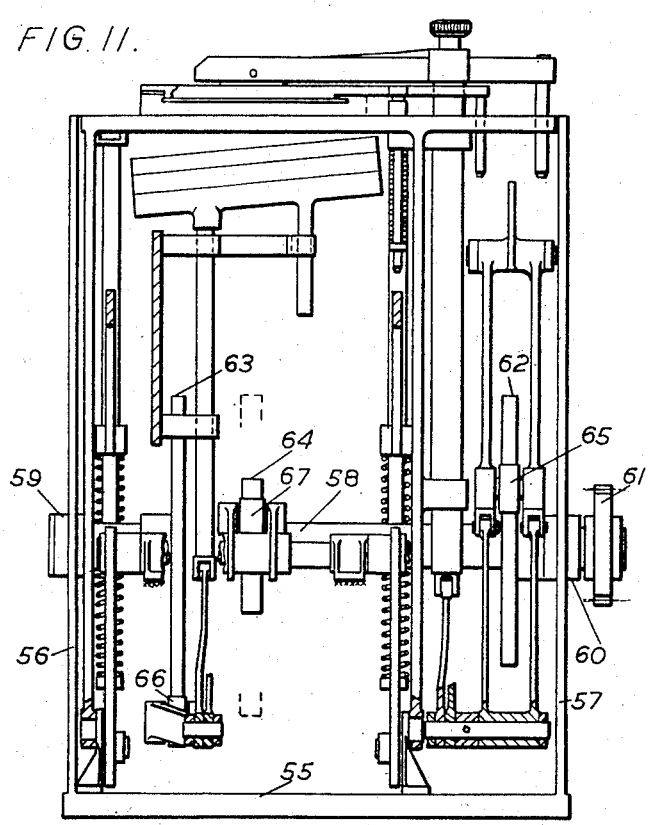
Inventor
MARCELLO VANZO
By Toulmin & Toulmin
Attorneys Dec. 14, 1954   M. VANZO   2,696,866
MACHINE FOR BUTT-SPLICING TWO CRUDE RUBBER TUBE ENDS
Filed May 11, 1951   10 Sheets-Sheet 7

Inventor
MARCELLO VANZO
By
Toulmin & Toulmin
Attorneys

Dec. 14, 1954   M. VANZO   2,696,866
MACHINE FOR BUTT-SPLICING TWO CRUDE RUBBER TUBE ENDS
Filed May 11, 1951   10 Sheets-Sheet 8
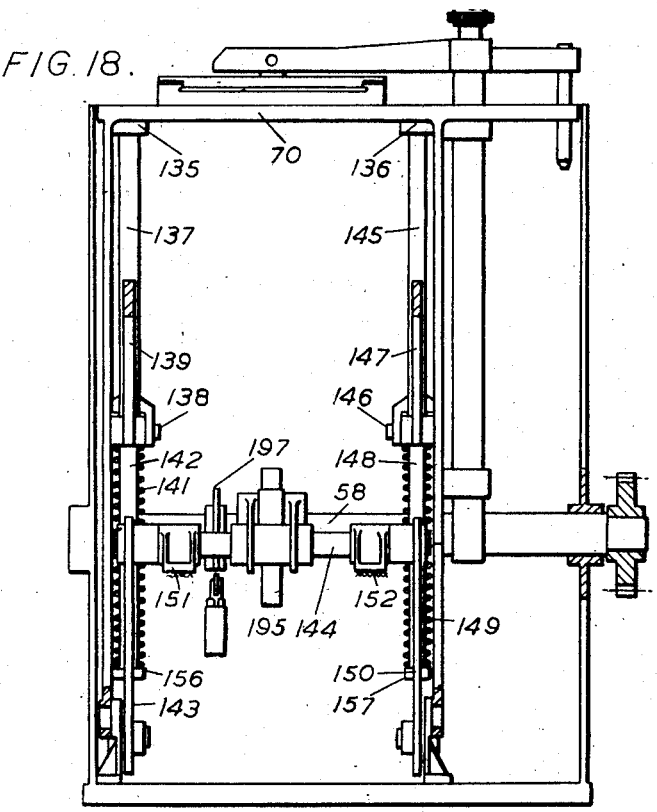
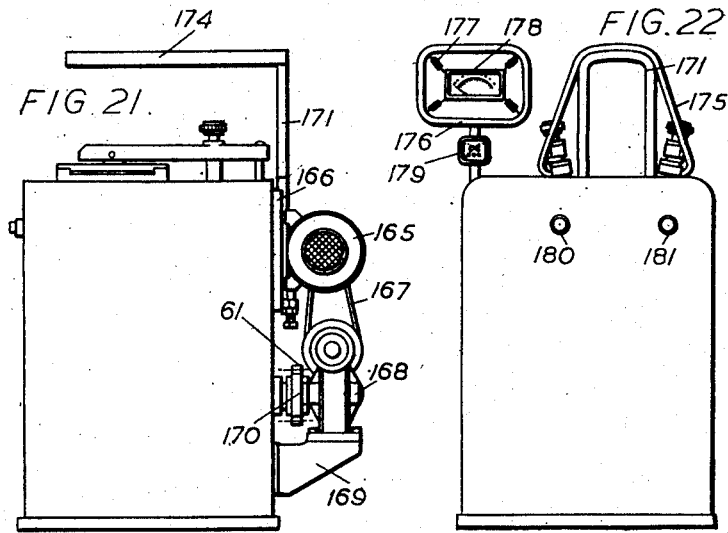
Inventor
MARCELLO VANZO
By Toulmin & Toulmin
Attorneys Dec. 14, 1954 M. VANZO 2,696,866
MACHINE FOR BUTT-SPLICING TWO CRUDE RUBBER TUBE ENDS
Filed May 11, 1951 10 Sheets-Sheet 9

Inventor
MARCELLO VANZO
By Toulmin & Toulmin
Attorneys

Inventor
MARCELLO VANZO

United States Patent Office 2,696,866
Patented Dec. 14, 1954

2,696,866

MACHINE FOR BUTT-SPLICING TWO CRUDE RUBBER TUBE ENDS

Marcello Vanzo, Milan, Italy, assignor to Pirelli Societa per Azioni, Milan, Italy, a limited liability company of Italy Application May 11, 1951, Serial No. 225,705

Claims priority, application Italy August 4, 1950

19 Claims. (Cl. 154—9)

This invention relates to machines for joining two crude rubber tube ends and has for its general object to provide such a machine in which all of the operations involved in performing the splice will be effected automatically.

The invention more especially concerns a machine for forming an endless (annular) tube (e. g. a pneumatic tyre air tube) by butt-splicing the ends of a length of crude rubber tube.

The lengths of crude rubber tube which are used in the manufacture of such endless tubes are cut to the required length according to the diameter of the endless tube to be formed from a straight continuous tube formed by means of an extruding machine.

The splicing of the ends of the cut lengths of tube is effected by a variety of methods which differ widely from one another from factory to factory. In some factories the various operations are performed by hand with the employment of various devices. These devices, even if they facilitate the work, always necessitate considerable employment of manual labour. In other factories the splicing is performed by machinery with the use of machines which automatically perform the different operations involved, leaving only for the operator to perform the operations of placing the cut lengths of tube to be spliced in position in the machine and removing the spliced tube from the machine after the joint has been formed. In this latter case the man power required is of course considerably less than that in the first (hand-manufacture) case.

The present invention, relating as it does, as already stated, to a machine for automatically performing all of the operations involved in butt-splicing two crude rubber tube ends (more particularly the ends of a previously cut length of crude rubber tube) refers, as regards the manufacture of endless tubes (e. g. pneumatic tyre air tubes), to the latter method of the two general methods referred to in the preceding paragraph, namely the automatic, machine-manufacturing method, the object in view in the invention being to devise a machine which will avoid certain of the inconveniences which generally characterise the machines at present on the market.

A crude rubber tube end butt-splicing machine as referred to above characteristically comprises a pair of clamps which firmly hold the tube ends during the succession of joining operations and these operations, which have to be performed automatically, may be enumerated as follows:

(1) The operation of closing the clamps on the tube ends, the latter having been placed in the clamps in such a manner that the extremities of the ends protrude slightly from the clamp in each case.

(2) The operation of cutting off the protruding extremities of the tube ends where these extend out from the clamps.

(3) The operation of bringing the two clamps together and thereupon compressing the cut edges of the tube end extremities one against the other so as to effect a firm union of the edges to one another.

(4) The operation of opening the clamps to enable the operator of the machine to remove the joined tube therefrom.

The inconveniences of butt-splicing machines at present on the market are principally due to the fact that the protruding extremities of the tube ends are cut off at a distance of some millimetres from the adjacent (front) face of the clamp. This will be clear from the remarks following.

In operation (3) of the operations enumerated above the cut edges of the tube ends have to be compressed firmly against one another in order to ensure that the material of the tube at the spliced edges shall become homogeneously continuous across the splice, and also to produce a local increase in the cross-sectional area of the tube at the splice, which latter effect imparts to the splice a maximum measure of resistance to rupture.

These effects are, however, difficult to realise, if in many cases at all possible to realise, owing to the fact already alluded to that the protruding extremities of the tube ends in position respectively in the two clamps of the machine are cut off at a distance in each case from the front face of the clamp, with the result that even after the cutting off operation the extremities of the tube ends still protrude a short distance from the adjacent faces of the clamps. Thus the protruding extremities are readily bendable and consequently tend to distort during the final stage of operation (3) of compressing the edges of the tube ends against one another, following the bringing of the edges into initial contact with one another as the result of bringing the clamps together in the manner described above.

Heretofore it has not been possible to overcome this difficulty, and the present invention sets out principally to meet it in a simple and efficient manner.

Before proceeding further, to delineate the features of the improved machine according to the present invention, the following further remarks will be made with reference to Figures 1 to 3 of the accompanying drawings, by way of enlarging upon the defect inherent in the known machines and which it is principally in mind in the present invention to avoid.

In the first place the cut is performed by firmly holding the tube ends between the cutting edge of a heated knife blade and an anvil disposed in opposition to the blade. The heated blade in the course of its forward stroke, but before commencing its cutting action on the tube end, tends to deform the latter in the manner shown in Figure 1, with the result that after the cut, the blade having withdrawn from the tube end and the two thicknesses of the tube end which have been cut through by the blade having returned (by their natural resilience) to positions of rest, the edges of the thicknesses at the cut are not perpendicular to the general planes of the thicknesses and coincident with one another as they would be if the distortion referred to had not taken place in the course of the forward stroke of the knife blade.

In consequence the edges of the thicknesses, upon meeting one another in the course of the operation (3) aforesaid of bringing the two clamps together, force the protruding extremities of the tube ends to take up biased positions as shown in Figure 2.

During the further approach of the clamps towards one another, to compress the cut surfaces against one another in the manner described above, this tendency for the protruding extremities of the tube ends to take up a biased position is enhanced and in consequence of the fact that the extremities are entirely unsupported, the extremities tend to bend on one side of the joint in the manner shown in Figure 3, whilst on the other side of the splice the external surfaces of the tube ends contact but, being soapstoned, do not adhere. As a result the splice which is formed tends to be an imperfect one.

The foregoing difficulty is greater the greater the extent of protrusion of the tube ends from the clamps. On the other hand the degree of compactness of the splice and its resistance to rupture are dependent largely upon the degree of compression of the cut surfaces of the tube ends against one another during the final phase of the approach of the clamps towards one another, which in turn is proportional to the degree of protrusion of the tube ends from the clamps at the commencement of this final phase. It follows therefore that there is a practical limit to the reduction of the degree of protrusion of the tube ends from the clamps beyond which it is impossible to go, if the desired compactness and resistance to rupture of the splice is to be attained.

If instead of natural rubber the tubes to be joined with the use of the machines in question are made of butyl rubber or some other synthetic rubber, it is found that owing to the smaller degree of adhesiveness of synthetic rubber as compared with that of natural rubber, and on account also of certain other characteristics of synthetic rubber, the difficulty above described with the use of the known machines is so great as to make a splicing operation with the use thereof very difficult indeed; the splice which is formed tends to be extremely weak, with the result that it is necessary to have recourse to low temperature hardening of the tube in order to prevent it from opening at the joint during the operation of shaping the tube, which operation generally precedes the vulcanisation step in the complete process of manufacture of the air tube.

From what has been stated above it will be apparent that a machine of the character in question herein should have the following characteristics:

A. The construction should be such that the extremities of the tube ends during the operation of cutting off the same should be so supported in the immediate neighbourhood of the plane along with the cutting blade on the side thereof towards the clamp moves as it performs its cut through the tube end, as to avoid any deformation of the tube end such as that referred to above with reference to Figures 1 to 3 of the accompanying drawings, with the result that the cut edges of the tube end will be truly perpendicular to the general planes of the two thicknesses of the tube end where these are held in the clamp during the cutting operation and coincident with one another.

B. The construction should be such as to maintain the support upon the cut extremities of the tube ends (i. e. against bending or other distortion thereof) right from the moment when the excess portions of the extremities are cut off to the moment when they come into contact with one another in the course of operation (3) aforesaid, so as to ensure that the cut edges of the extremities shall meet in exact register with one another, which is necessary, as will be understood, for the formation of a perfect splice.

C. The construction should be such that the further relative movement of the tube ends towards one another during the final phase aforesaid of the approach of the clamps (operation (3)) shall be of the maximum length possible in order to ensure a sufficient degree of compression of the cut surfaces against one another to give the required compactness and resistance to rupture of the splice.

D. The construction should be such that during said final phase of the approaching movement of the clamps towards one another (operation (3)) the marginal portions of the tube ends in the immediate neighbourhood of the cut edges thereof are enclosed within what is in effect a mould operative to limit the flow movement of the rubber of the tube wall, preventing free escape of the rubber and compelling it to form a local thickening of the wall along the line of the splice, said thickening being caused during the subsequent operation of vulcanising the spliced tube to take up a position interiorly of the tube, forming a bulge therein which imparts to the splice the necessary strength and resistance to rupture.

The improved machine which is provided by the present invention has these characteristics, as will hereinafter appear.

According to the invention, a machine for butt-splicing two crude rubber tube ends comprises (A) a pair of mutually opposed clamps in which prior to the commencement of a cycle of operations of the machine the tube ends are placed in such a position that the extremity of the end in each case protrudes beyond the corresponding clamp in the direction towards the opposite clamp, said clamps being automatically closable upon the tube ends thus placed in position within them, as a first phase in the cycle of operations of the machine and automatically openable to enable the spliced tube ends to be removed from the machine, as a later phase in said cycle, and (B) an automatic knife mechanism operable to cut off the protruding extremities of the tube ends in position in the closed clamps, at least one of the clamps being reciprocatable towards and away from the other clamp once per cycle of operation of the machine in time with the opening and closing of the clamps and also the operation of the knife mechanism; the complete cycle of operations of the machine including the following phases (which may in some cases overlap or even be entirely concomitant): (1) closure of the clamps, (2) operation of the knife mechanism, (3) movement of the reciprocatable clamp in the direction of the other clamp, to bring the freshly cut edges of the tube ends first into contact with one another and then by continued movement of the clamp into compressive engagement with one another so as firmly to unite the edges, (4) opening of the clamps and (5) return of the reciprocatable clamp to initial position in readiness for the next cycle of operations; and the various moving parts of the machine performing their operations automatically and in timed sequence with one another under drive from three main cams transmitting their motion through the intermediary of associated lever systems and allocated respectively one to the opening and closing of the clamps, another to the operation of the knife mechanism and the third to the reciprocation of the movable clamp.

The invention will now be further described with reference to the accompanying drawings.

In these drawings:

Figures 1 to 3 illustrate, as already indicated, a principal defect of the known machines, which the improved machine of the present invention is designed to avoid, while Figures 4 to 23 illustrate one embodiment by way of example of the improved machine according to the present invention.

Of said Figures 4 to 23:

Figure 4 is a front view of one of the clamps of the machine as hereinbefore referred to;

Figure 5 is a horizontal section through Figure 4 on the section line A, B, C, D thereof;

Figure 6 is a vertical section through Figure 5 on the section line 6—6 thereof;

Figure 7 is a vertical section through Figure 5 on the section line 7—7 thereof;

Figure 8 is a vertical section through the two clamps of the machine illustrating the phase in the operation of the machine during which the protruding extremities of the tube ends are cut off in the manner hereinbefore described;

Figure 9 is a view similar to Figure 8 but showing the relative positions of the parts at the point in the relative approach of the clamps towards one another at which the cut edges of the tube ends are in meeting contact with one another, i. e. immediately prior to the final phase aforesaid of operation (3);

Figure 10 shows the parts at the end of said final phase;

Figure 11 is a side view of the machine (devoid of outside covers), the machine showing all of the various driving mechanisms as hereinafter more particularly described, which control the movements of the various parts of the machine, including in particular the clamps and the knife mechanisms;

Figure 12 is a front view of the machine;

Figure 14 is a front view of the machine corresponding to Figure 13;

Figure 18 is a side view of the machine but restricted as to the parts appearing in the figure to those which relate to the relative approach and recession of the clamps;

Figure 21 is also a general external view of the machine viewed from the opposite side thereof;

Figure 22 is a general external view of the machine viewed from the front thereof, where the operator of the machine stands during a splicing operation with the use of the machine.

Like reference numerals are applied to like parts in the various figures.

Figure 1:
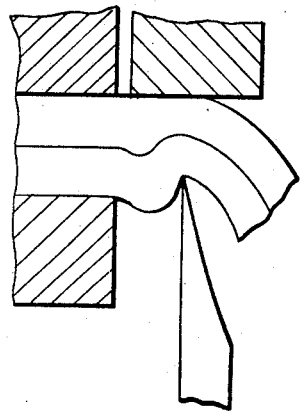
Figure 2:
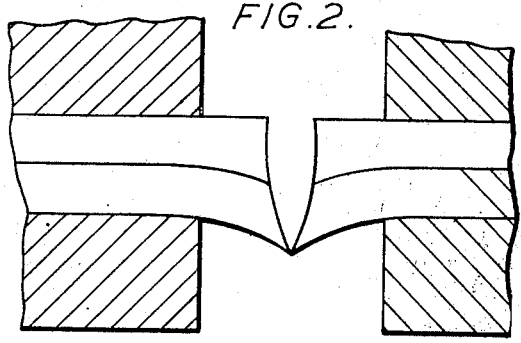
Figure 3:
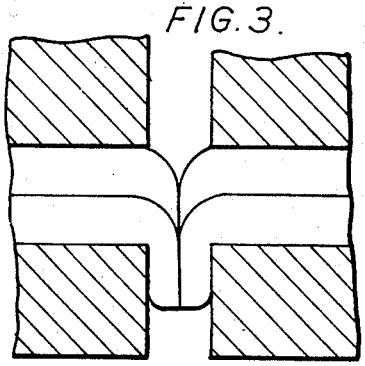
Figure 4:
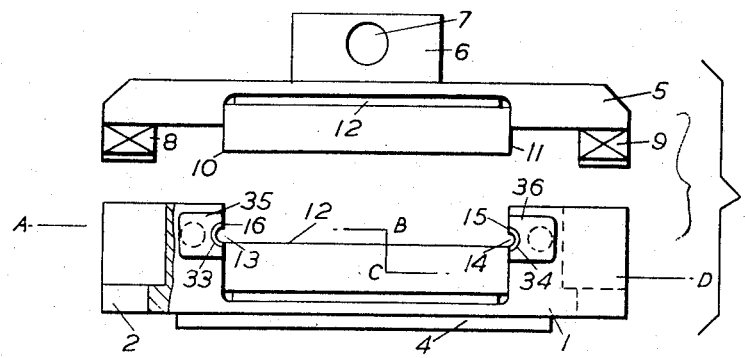

From the foregoing it will be apparent that what principally characterises the machine according to the invention, as compared with the known machines, is the form and manner of operation of the clamps. For this reason this part of the machine will be described first.

The two clamps of the machine, which it may be remarked have to be so designed and arranged as in their relative approach, to produce a relative movement of the tube ends along a path which is substantially rectilinear as regards that portion of it which is traversed during the final phase aforesaid of the approach, are identical. Consequently, only one of the clamps will be described in detail.

As shown in Figures 4 to 7, the clamp comprises a lower half 1, which is fixed to the machine by two screws seated respectively in a pair of cavities 2, 3 and is centered by a key 4, and an upper half 5 which is coupled to the part of the machine which carries it by a tongue 6 and a pin which extends through a bore 7 in the tongue and permits of a certain amount of oscillation of the half 5 for the purpose of ensuring uniform pressure along the whole of the transverse section of the tube and laid on the lower half 1 of the clamp.

The upper half 5 is maintained in register with the lower half 1 in one direction by the action of two keys 8, 9 and in a direction at right angles thereto by means of plane surfaces 10, 11, these surfaces and the keys 8, 9 being carried upon the upper half 5 as will be seen from the drawings.

In the lower half 1 are two channels 13, 14 adapted to contain the folds of the tube end linking the remaining part of the tube end, which lies flat along the bottom of a cavity 12 in the lower half 1, thereby keeping the folds outside of the zone which is subjected to compression by the underside of the central portion of the upper half 5 in the operation of the clamp.

In the lower half 1 (Figure 6) on the side thereof towards the path of the associated knife (hereinafter more particularly described) is a cavity 17 in which a fillet 18 is located. This fillet is supported by two shanks 19 of which only one appears in Figure 6.

The fillet 18 is pushed towards the exterior of the clamp by two springs 20, of which only one appears in Figure 7, and against the underside of the lower fold of the tube end in position in the clamp by two other springs 21, of which again only one appears in Figure 7.

Springs 21 seat on the horizontal flange of an L-section sheet metal washer 22 interposed between the springs and the bottom wall of the cavity 17 in the manner shown. This L-section washer moves as one with the fillet 18 as the latter moves inwardly and outwardly of the clamp and it serves to avoid any oblique bending of the springs 21 during said movements of the fillet.

The upper side of the cavity 17 is bounded by a very thin wall 23 against the underside of which the fillet 18 at the upper side thereof bears. As shown, said underside of the wall 23 and the upper side of the fillet 18 are at an angle of a few degrees to the surface of the bottom of the cavity 12.

The two shanks 19 extend in each case through a hole 24 of considerably larger diameter than the shank (see Figures 5 and 6), which hole terminates at the end thereof towards the rear of the clamp with a smaller hole 25, which however is larger in diameter than the shank 19 so as to afford to the fillet a freedom for slight upward and downward movement as it moves along the inclined wall 23 towards and away from the interior of the clamp.

Screwed on to the outer end of each shank 19 is a nut 26. The nuts 26 oppose the thrust of the springs 20 and by screwing the nuts more or less along the shanks 19 the fillet 18 is finely adjustable to such a position that the forward edge of its inclined upper surface is exactly at the same level as the bottom of the cavity 12 on which the tube end is placed, i. e. when the fillet is in the "out" position in which it appears in Figures 4 to 7.

In the upper half 5 of the clamp is a fillet 27 guided by a pair of shanks 28 and urged outwardly of the clamp by a pair of springs 29, 30 in a manner exactly similar to that already described in respect of the lower half 1 of the clamp.

In the lower half 1, on the side thereof towards the path of the knife aforesaid are two cavities 31, 32 (Figures 4 and 5) which leave around the channels 13, 14, two part-cylindrical walls 33, 34 of small thickness dimension.

Within the cavities 31, 32 and slidable therealong in the direction of depth of the clamp half from front to back thereof are two small blocks 35, 36. These blocks are so shaped as to form, as regards the front faces of the blocks, a continuation of the front faces of the fillets 18, 27 in the sense that the front faces of the blocks are flush with the front faces of the fillets and lie in the same plane as these latter mentioned front faces.

The blocks 35, 36 are prolonged in the direction towards the rear of the clamp by shanks 37 which extend through holes 38 formed in the body of the lower part of the clamp to receive them. Screwed on to the outer end of the shanks 37 are regulating nuts 39 which oppose the thrust of springs 40 surrounding the shanks and operable to urge the blocks 35, 36 in the direction forwardly of the clamp.

The fillets 18, 27 on the one hand and the blocks 35, 36 on the other are adjustable relatively to the body portions of the clamp halves, by screwing the nuts 26 to a greater or lesser extent along the shanks 19 (i. e. in the case of the fillets 18, 27) and similarly by screwing the nuts 39 to a greater or lesser degree along the shanks 37 (in the case of the blocks 35, 36) in such a manner as to be settable relatively to the respective body portions in such positions that the front faces of the fillets are exactly flush with the front faces of the blocks, with the result that there is formed around the tube end, held firmly in the clamp, a continuous plane wall which in a manner hereinafter more particularly described will be skimmed by the knife which cuts off the protruding extremity of the tube end, during the operation of the knife mechanism, the parts (namely the fillets and the blocks) carrying this wall being capable of moving into the body of the clamp as a single unitary member as soon as the wall becomes abutted by the corresponding plane wall of the opposite clamp of the machine in the course of operation (3) aforesaid, i. e. during the final phase of the relative approach of the clamps towards one another. On account of the fact that the fillets 18, 27 are (in the proper setting of the parts) in such a position that the forward edge of the inclined upper surface of the fillet is exactly at the same level as the bottom of the cavity 12 on which the tube end is placed, when the fillet is in the "out" position in which it appears in Figures 4 to 7 (as above described) and similarly the fillet 27 is in such a position that the forward edge of the inclined lower surface of the fillet is exactly at the same level as the top of the cavity 12 when the fillet is in the "out" position, the forward edges of the fillets are caused to bear against the upper surface of the uppermost fold of the tube end in position in the clamp and the lower surface of the lowermost fold thereof, with the result that the portion of the folds of the tube end which protrude from the body portions of the clamp halves above the fillet 18 and below the fillet 27 are supported by surfaces on the clamp (namely the forward edge of the inclined upper surface of the fillet 18 and the forward edge of the inclined lower surface of the fillet 27) which hold it firmly (i. e. against bending or distortion otherwise in any direction) throughout the cutting operation and also throughout the relative approach of the clamps towards one another, said portion of the folds being supported thus right to the extreme end of the portion and therefore to the plane of the cut which is produced by the knife as this shears its way through the folds. Figures 8 to 10 may be referred to in this connection as illustrating the action just described.

Referring now to Figures 11 and 12, it will be seen that the machine comprises a base plate 55 upstanding from which, at the two sides of the machine, are side walls 56, 57. All of the internal mechanisms of the machine are enclosed between these two side walls and for the most part supported thereby.

Substantially at the centre of the machine is a main shaft 58 journalled in bearings 59, 60 carried upon the side walls 56, 57.

The shaft 58 is driven through a toothed gear 61 meshing with a pinion (not shown) forming part of a reduction gear.

On the shaft 58 are three cams 62, 63, 64. These cams are fast with the shaft and through the intermediary of cam follower rollers 65, 66, 67 they respectively control through intervening members hereinafter described the following operations:

I. The opening and closing of the clamps of the machine.

II. The reciprocatory movements of the knives which cut off the protruding extremities of the tube ends after these have been placed in the clamps in the manner hereinbefore described.

III. The relative approach and recession of the clamps, including in the case of the approach the final (compression) phase thereof during which the extremities of the tube ends are compressed against one another.

In order to facilitate an understanding of the manner in which the machine operates the three parts of the machine which concern the foregoing principal operations I, II, III have been illustrated separately in Figures 13 and 14, Figures 15, 16 and 17 and Figures 18 and 19 will accordingly be described separately in the following further description of the machine.

Figure 13:
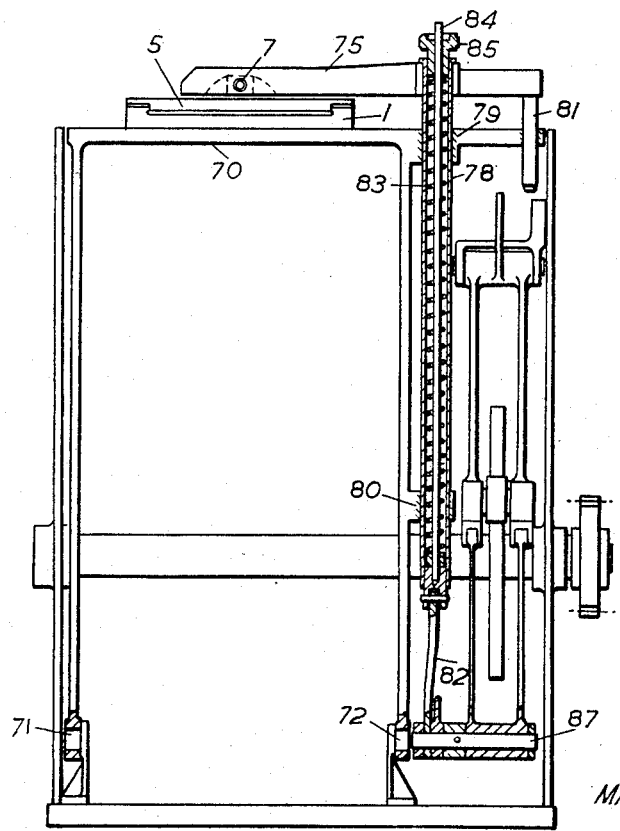
Figure 13 is a side view of the machine but restricted as to the parts appearing in the figure to those which control the opening and closing of the clamps.

Referring first to the part of the machine which concerns operation I, it will be seen from Figures 13 and 14 that the lower half 1 of the left hand (in Figure 14) clamp is supported upon a mobile bridge 70 comprising an horizontal cross head and two vertical standards, the standards being journalled at the lower end thereof in bearings 71, 72.

The lower half 73 of the right hand (in Figure 14) clamp is supported upon a bridge 74 similar to the bridge 70 but fixed to the side walls 56, 57 of the general framework of the machine.

As will be understood, therefore, the construction illustrated in the drawings and now being described is one in which one of the clamps of the machine is reciprocatable to effect the relative approach and recession of the clamps towards and away from one another, and the other is stationary in the machine.

The upper half 5 of the reciprocatable clamp is coupled through the intermediary of the pin hereinbefore referred to (see the description of Figures 4 to 7) which extends through the bore 7 in the tongue 6 of the half, to the outer end of an arm 75. In the same manner the upper half 76 of the other clamp is coupled to the outer end of an arm 77 similar to the arm 75.

The arm 75 is carried upon the upper end of a sleeve 78 to which it is fixed. The sleeve 78 slides in supports 79, 80 carried upon one of the vertical standards of the mobile bridge 70. The arrangement is one in which the arm 75 is displaceable vertically but is prevented from rotation about the axis of the sleeve 78 by means of a pin 81 slidable with the rising and falling movements of the arm 75 and sleeve 78, in a guide bore provided to receive it in the horizontal cross head 70, near the right hand (in Figure 13) end thereof.

The vertical movement of the sleeve 78 and arm 75 is controlled by a lever 82 operatively connected to the sleeve 78 through the intermediary of a compression spring 83 to which are transmitted the thrusts from the lever 82 by means of a rod 84 extending through the sleeve coaxially thereof in the manner shown in Figure 13. The compression of the spring 83 is variable at will by screwing inwardly or outwardly a nut 85 in screw threaded engagement with the upper end of the rod 83. With such an arrangement two advantages are realized. Firstly it is possible to regulate the pressure of the upper part of the clamp upon the tube end placed upon the lower part thereof. Secondly it is possible to avoid the existence of excessive stresses in the machine in the event of a foreign body of greater size than the height of the working space between the two halves of the clamp gaining access to said working space so as to interfere with proper closure of the clamp.

What has been described with reference to the arm 75 of the left hand (in Figure 14) clamp of the machine applies also to the arm 77 of the other clamp, the vertical movement of the arm 77 of this clamp and therewith of the corresponding sleeve being controlled by a lever 86 similar to the lever 82.

The levers 82, 86 are fulcrummed on a pivot 87 carried upon the free end of a lever 88. This lever is fulcrummed on a fixed pivot 89 carried on the side walls 56, 57 of the framework of the machine.

On the pivot 87 is also fulcrummed a lever 90 forming with a second lever 91, a toggle system, the hinge of which is constituted by a pivot 92. The lever 91 of this toggle system is fulcrummed to a fixed pivot 93 carried upon the side walls 56, 57.

Near the pivot 92 of the toggle system 90, 91 and carried upon the lever 91 thereof is a roller 65 which is normally urged towards the cam 62 by means of a traction spring 94 acting through the intermediary of a lever 95 in fixed relation to the lever 91.

From the foregoing it will be apparent that if the cam 62 rotates in the direction of the arrow in Figure 14 the roller 65 will move towards or away from the driving shaft 58, so shortening or lengthening the distance between the terminal pivots 87, 93 of the toggle 90, 91 and raising or lowering as the case may be the arms 75, 77 and with these arms the upper halves of the clamps relatively to the lower halves thereof.

It should be remarked that as soon as the clamps are closed the axis of the pivot 87 is in horizontal alignment with the common axis of the pivots 71, 72. This condition is absolutely necessary in order that the pressure of the upper halves of the clamps upon the lower halves thereof shall not be subjected to any change as the mobile bridge 70 completes its approach movement towards the fixed bridge 74.

As the pivot 92 approaches a straight line joining the axes of the terminal pivots 87, 93 of the toggle, the pressure exerted by the cam on the lever 88 through the roller 65 and the links of the toggle 90, 91 increases by the toggle action of the levers, with the result that the downward pressure of the upper clamp halves upon the lower halves of the clamps correspondingly increases. In other words, an arrangement is provided in which the maximum closing effort is applied to the clamps so long as the tube ends to be jointed are kept tight therein.

Figure 15:
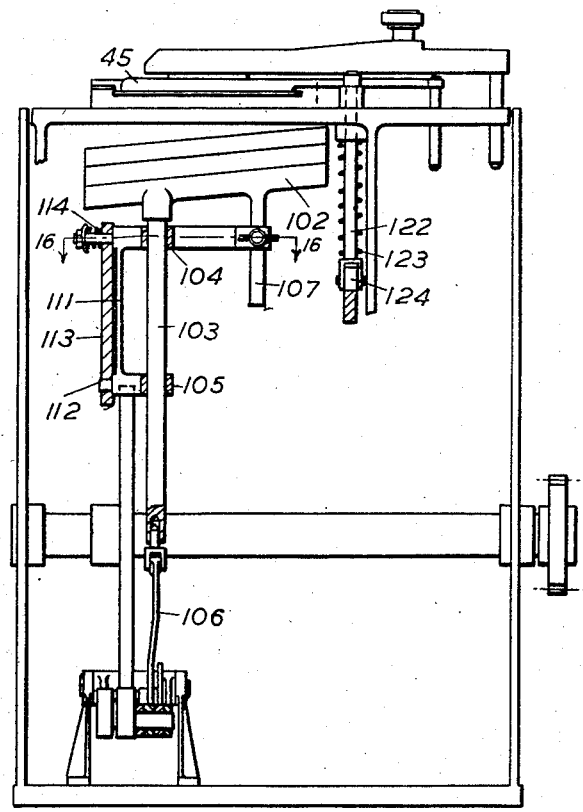
Figure 15 is a side view of the machine but restricted as to the parts appearing in the figure to those which perform the operation of cutting off the protruding extremities of the tube ends.
Figure 16:
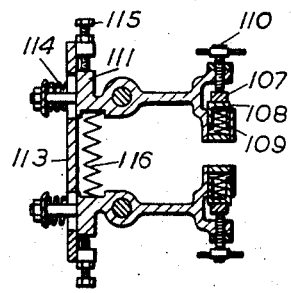
Figure 16 is a fragmentary horizontal section through Figure 15 on the section line 16—16 thereof.
Figure 17:
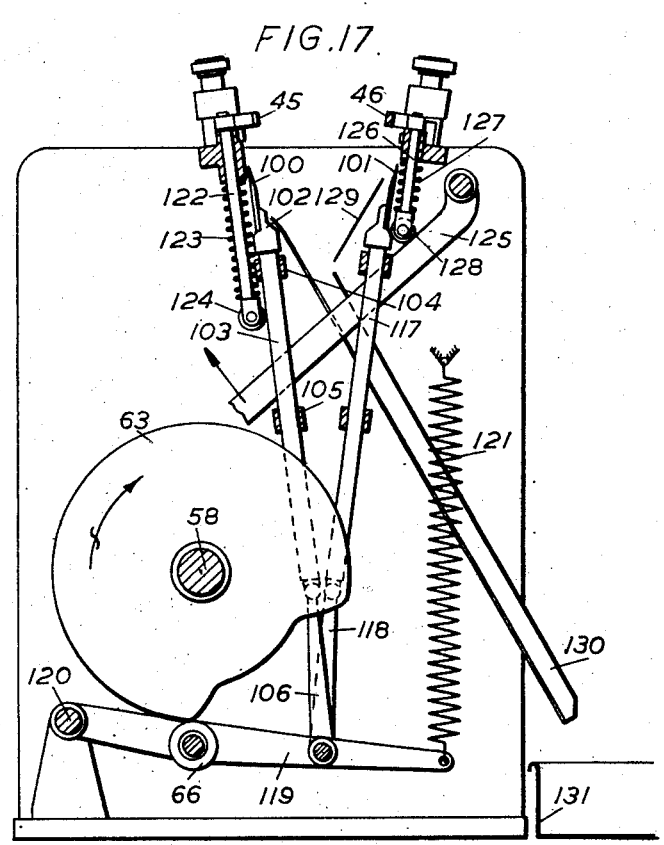
Figure 17 is a front view of the machine showing the parts which appear in Figures 15 and 16.

Referring now to Figures 15, 16 and 17, these figures show the mechanism for cutting off the protruding extremities of the tube ends, it being understood that the tube ends to be spliced in the machine would be laid in the respective clamps in such a position therein that the extremities of the ends would protrude beyond the common plane of the front faces of the fillets 18, 27 and blocks 35, 36 of the clamps.

The cutting is performed by two knives 100, 101, each heated by an electric resistance enclosed within the knife blade.

The knife 100 is affixed by means of screws to a knife support 102, its upper (cutting) edge being disposed at a slight inclination to the horizontal to enable the knife to operate with less effort in cutting through the thicknesses of the tube end.

The knife support 102 is supported upon the upper end of a vertical rod 103 slidable lengthwise in a pair of supports therefor 104, 105. The lower part of the rod 103 is pivotally connected to the upper end of a lever 106.

The rod is displaceable vertically in the supports 104, 105 but it is prevented from rotation around the axis of the rod by the action of a rod 107 slidable as one with the knife support 102 and the rod 103 between a cup 108 urged by a spring 109 and a screw 110. This arrangement enables, by adjustment of the screw 110, a fine adjustment within limited range of the angle of orientation of the knife 100 so as to obtain perfect parallelism as between the cutting edge of the knife and the front faces aforesaid of the fillets and blocks of the associated clamp.

The two supports 104, 105 are connected with an arm 111 hinged on a pin 112 in a plate 113 fixed to the side walls 56, 57 of the machine framework. A spring 114 keeps the arm 111 pressed against the plate 113 and an adjusting screw 115, opposing the action of a spring 116, permits of a small degree of displacement of the knife 100 towards and away from the plane of the front of the corresponding clamp, as the result of angular movement of the rod 103 and the parts movable as one therewith including the knife support 102, the arm 111 and supports 104, 105, around the axis of the pin 112. In this way, an arrangement is provided in which the path of the knife 100 is finely adjustable to a position in which the knife just skims the front faces (which are flush with one another as above described) of the fillets 18, 27 and blocks 35, 36.

The knife 101 is supported by a vertical rod 117, sliding in two supports identical to those described with reference to knife 100 and the various other parts associated with the knife 100, including the parts which enable the path of the knife to be so adjusted in relation to the plane of the front of the corresponding clamp that the knife just skims the front faces of the fillets and blocks of the clamp, are duplicated for the knife 101.

The vertical rods 103, 117 are pivotally connected at the lower end to two levers 106, 118, which in turn are fulcrummed on a horizontal arm 119. This arm is fulcrummed at one end on a pin 120 carried on a bracket affixed to the base of the machine framework and at the other end it is pulled by a traction spring 121. In this manner, the roller 66 is normally urged against the cam 63. It will be evident that if the cam 63 turns in the direction of the arrow, the roller 66 will move nearer to or further away from the axis of the main shaft 58 and so produce vertical (upward or downward) movement of the two knives.

It has to be noted that the upward movement of the knives is produced by the traction spring 121. Consequently this spring has to be powerful enough to overcome the resistance of the two tube ends to be cut through by the knives. On the other hand the spring should not be so powerful as to result in damage to the edges of the knives should these encounter during their travel a foreign body.

As already indicated, the severance of the tube ends is accomplished by a shearing action. In order to keep the tube ends horizontal during the cutting off operation, there are provided two horizontal arms 45, 46. Arm 45 is supported by a vertical shaft 122 which with the arm is pulled down by a traction spring 123. The lower end of the shaft 122 carries a roller 124 which bears on an arm 125 co-acting with the closing movement of the mobile bridge toward the fixed bridge. In a similar way the arm 46 is supported by a vertical shaft 126 pulled down by a spring 127 and carrying a roller 128 which bears on the same arm 125.

As long as the mobile bridge is open, the arm 125 is in a lowered position and the arms 45, 46 are also maintained in the lowered position by means of the springs 123, 127. As soon as the arm 125 is lifted by the approaching movement of the mobile bridge to the fixed bridge, it raises with it the two rollers 124, 128 and also the two arms 45, 46 to such a position that the arms are clear of the path of the reciprocatable clamp.

In Figure 17 is shown a hopper 129 down which fall the severed ends of the tube into a chute 130 which delivers them into a box 131 disposed exteriorly of the machine.

Figure 19:
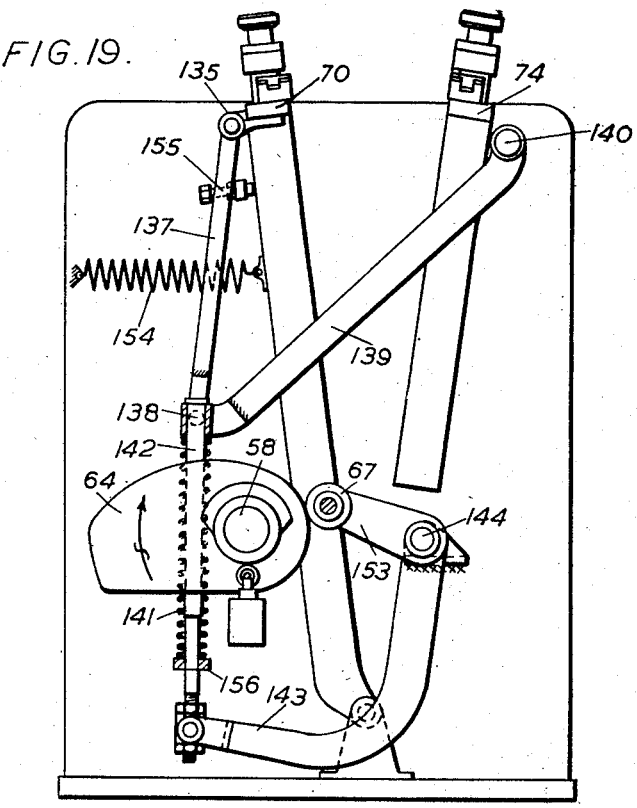
Figure 19 is a front view of the machine corresponding to Figure 18.

Figures 18 and 19 illustrate the mechanism for producing the approach and recession of the mobile bridge 70 towards and away from the fixed bridge 74.

On the horizontal crosshead of the mobile bridge 70 are fixed a pair of supports 135, 136.

To the support 135 is hinged a lever 137 which at its lower end is pivotally connected by a pin 138 to the lower end of a lever 139, the upper end of which is fulcrummed on a pin 140 supported from the side walls 56, 57 of the the machine framework.

Upon the pin 138 bears a spring 141 guided by a rod 142 pivoted at its lower end to a lever 143 keyed to a shaft 144.

To the support 136 is hinged a lever 145 which at its lower end is pivotally connected by a pin 146 to the lower end of a lever 147 the upper end of which is fulcrummed to a pin similar to the pin 140 supported from the side walls of the machine framework.

Upon the pin 146 bears a spring 149 guided by a rod 148 pivoted at its lower end to a lever 150 keyed to the shaft 144.

The shaft 144, which is journalled in bearings 151, 152 carried upon the general framework of the machine, has keyed to it, at the centre an arm 153 carrying at the free end thereof a roller 67, which bears on the cam 64.

The bearing of the roller 67 on the cam 64 is maintained not only by the weight of the mobile bridge, but also by the effort of a traction spring 154.

The precise retracted position for the mobile bridge 70 is regulated by an adjustable stop screw 155.

Rotation of the cam 64 in the direction of the arrow, causes the roller 67 to approach or, according to the position of the cam, move away from the axis of the shaft 58 and so to oscillate the arm 153 and with this the shaft 144. The oscillation in turn produces corresponding upward and downward movement of the levers 143, 150 and therewith the pins 138, 146. The levers 137, 145 consequently tend to move into alignment with the levers 139, 147, forcing the two supports 135, 136 and with these the mobile bridge 70 to move in the direction towards the stationary bridge 74, i. e. during a first part of a complete revolution of the cam 64, the said movement of the parts referred to being performed as regards the final phase thereof, against the reaction of the stationary bridge.

As in the case of the closure of the clamps, the forward stroke of the mobile bridge is performed by the yielding thrust of two springs 141, 149 in order to avoid an excessive strain upon the machine in the event of a foreign body gaining access to the space between the relatively approaching parts.

By means of set screws 156, 157 it is possible to adjust the compression of the springs 141, 149 and thereby to regulate the pressure which the mobile bridge is pushed against the stationary bridge.

Figure 20:
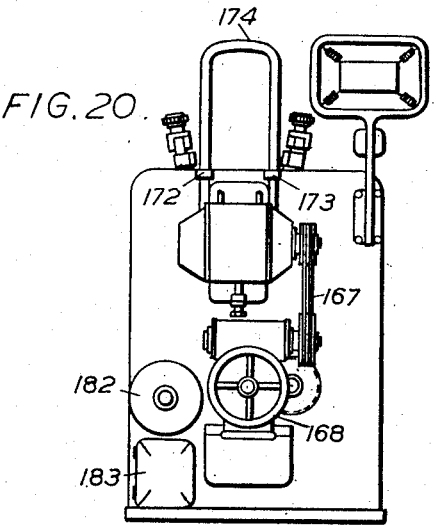
Figure 20 is a general external view of the machine viewed from one side thereof at which side the driving motor of the machine is situated.

Referring now to Figures 20, 21 and 22, the driving motor 165 is mounted through the intermediary of a slide 166 upon the rear part of the general framework of the machine and drives through a set of belts 167 an endless screw reduction gear 168 supported upon a bracket 169.

On the driven (slow turning) shaft of the reduction gear 168 is a pinion 170 which through the gear 61 (Figure 11) drives the cam shaft 58 and therefore all the component mechanisms of the machine.

On the same rear part of the machine framework is a length of piping 171 bent to U-shape. This U-shaped member can slide vertically in two bushes 172, 173, in which also it can be fixed in the suited position by means of two clamping screws.

On the horizontal part of the U-shaped member 171 is carried a sheet metal saddle 174 on which rests the central part of the tube 175 to be joined. The saddle 174 can be raised or lowered as required to suit the length of the tube 175.

On the same rear part of the machine framework is also fixed a tubular frame 176 shaped to sustain by means of four springs 177 a pyrometer 178.

On the stem portion of this frame is a regulatable ime relay 179 which allows the time during which the ;lamps, and therefore the ends of the tube to be spliced, remain pressed the one against the other, to be regulated at will.

On the front of the machine are mounted two electric push button switches 180, 181 which in the use of the machine are pushed simultaneously by the operator of the machine in order to start the driving motor.

On the rear part of the machine framework is a transformer 182 which allows the temperature of the cutting knives to be regulated at will, and also a box 183 containing the electric apparatus.

Figure 23:
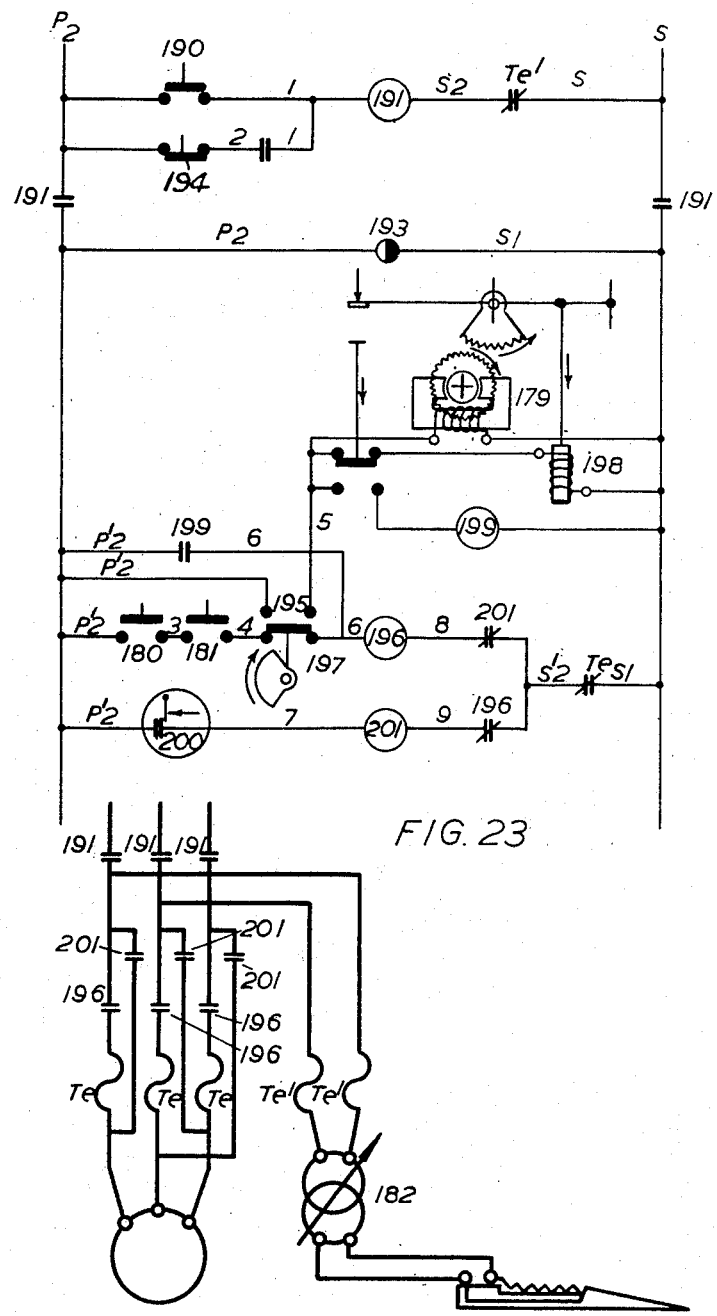
Figure 23 is a circuit diagram illustrating the function of the electrical parts of the machine which serve to control the mechanical parts in the manner hereinafter more particularly described.

Referring, finally, to Figure 23, the electric installation for the automatic control of the machine comprises essentially an electric motor provided with a reverse-current brake up to zero speed; a resistance for heating the cutting knives, fed by a regulable time relay for certain teleswitches; and push-buttons arranged to coordinate the various operations.

At the beginning of a cycle of operation of the machine all the switches are in the rest position, as clearly shown in Figure 23.

To bring the machine into operation, but prior to actually starting a cycle of operation of the various mechanisms of the machine, the operator presses the push button 190 of the general supply, which controls a teleswitch 191, effective to insert a regulatable tension transformer 182 for the supply of the heating resistances of the knives and for the lighting of a lamp 193 the operation of which indicates that the circuit is closed. The teleswitch 191 remains automatically closed by means of a push button 194 and supplies the line controlling the motor and the devices which allow the starting of the machine.

To start a cycle of operation of the various mechanisms of the machine the operator then presses the push buttons 180, 181. These push buttons are in series connection and through an armature 195 they act on a teleswitch 196 which starts the forward rotation of the motor.

This teleswitch remains closed so long as the push buttons 180, 181 are in the operated position and only when the mobile bridge 70 is bearing against the stationary bridge 74 is the teleswitch 196 definitively excited if the two push buttons are in the rest position. This is in order to prevent the possibility during the first phase in the cycle of operations of the machine, of the operator coming into contact with the moving parts of the machine with consequent possible injury to his person.

As soon as the mobile bridge 70 has closed, a cam 197 displaces the armature 195 from the position 4–6 to that P'2–5, causing the teleswitch 196 to open, with the result that the motor stops, the current being led to supply the relay 179 and an electromagnet 198, which latter closes the relay, which in turn automatically regulates the closure of the clamps. At the end of a predetermined period of time, the relay supplies current to a magnet 199 which, by means of an auxiliary contact controlling the circuit P'2–6, re-excites the teleswitch 196 which controls the forward stroke of the reciprocatable clamp and the completion of the operative cycle of the machine, the second part of the cycle proceeding to the end automatically since the supply to the teleswitch 196 is directed through P'2–199–6.

The cam 197 at the end of the cycle, frees the armature 195 so as to cut the supply P'2–6, thereby stopping the motor, the whole of the moving parts having been brought again to the starting position.

In order to produce an instantaneous stopping of the machine, the following device comes into action:

The teleswitch 196 which controls the forward movement of the parts at the moment of its insertion, prevents through its inverted contact, the supply of current to a teleswitch 201 arranged to control the rearward movement of the parts, whereas a switch 200 at the zero speed, turning for the forward movement, inserts the current phase P'2. In the case of stopping, the teleswitch 196, by its opening through its inverted contact, inserts the current phase S'2 to the teleswitch 201 for the rearward movement, which teleswitch 201, receiving the phase P'2 through the contact of the switch 200 for the zero speed, electrically brakes the motor up to the complete stopping point, when all is reset for a new start.

The working of the machine is as follows:

At the end of the splicing operation the machine stops automatically with the upper part of the clamps raised, with the mobile bridge in the retracted position and with the knives in the lowered position.

As soon as the operator has placed on the saddle 174 the tube to be spliced and properly disposed its ends on the lower part of the clamps, he pushes the two push buttons 180, 181, so starting the motor and with this the driving shaft on which the three cams (62, 63, 64) are fixed. The outline of these cams is such that each of them controls a movement during a fraction of 360° of rotation and the cams are so positioned on the shaft relatively to one another that the various movements they respectively control are performed according to a predetermined sequence.

The first movement, after the operator has started the machine, is the closing of the upper parts of the clamps on the lower parts thereof. As soon as this movement has been completed, the two knives rise and sever the protruding extremities of the tube ends outstanding from the clamps. The severed extremities fall into the hopper 129 and thence by way of the chute 130 into the box 131. As soon as the severing action of the knives has been completed, the knives return to their starting (i. e. lowered) position, which initiates the phase of closure of the mobile bridge towards the stationary bridge and simultaneously the raising of the horizontal arms 45, 46.

Upon the mobile bridge having reached the completion of its forward stroke, the clamp upon it now pressing against the clamp on the stationary bridge with resulting compression of the tube ends against one another at the freshly cut edges thereof, the cam 197 (Figure 18) on the driving shaft 58, acting on the contact 195, stops the driving motor and at the same time closes the electric contact which starts the regulating device 179.

From this moment on the operator can take his hands away from the push buttons 180, 182, since there is no longer any danger of the operator being caught by moving parts of the machine.

After the predeterminated period of time above referred to the device 179 re-starts the driving motor, which thereupon raises the upper part of the clamps and retracts the mobile bridge. The operator takes away the now joined tube and inserts another tube to be spliced.

The working of the clamps will now be described.

The tube to be spliced, which should have in the flattened condition a slightly larger breadth dimension than that of the cavity 12 including the two semi-cylindrical channels 13, 14 and a slightly smaller thickness dimension than the diameter dimension of the channels 13, 14, is first curved to form a ring, whereupon its ends (41, 42, Figure 8) are placed in the clamps and tightened therein between the lower and upper halves of the clamps.

The machine having been started, the knives 43, 44 rise to cut off the protruding extremities of the tube ends outstanding from the clamps, by skimming the plane formed by the front faces of the fillets 18, 27 and blocks 35, 36. During this operation the plane freshly cut edges of the tube ends are held firmly by the fillets 18, 27.

The tube end extremities to be cut off being contained between two rigid metal planes and the cut being made as near as possible to the line where these planes firmly hold the tube, and moreover the rubber being cut by means of a suitably heated knife having a shearing action, the resulting cut surfaces are perfectly plane, coincident with one another and perpendicular to the general planes of the two thicknesses of flattened tube held in the clamp.

In order to facilitate the cutting operation and the complete severance of the cut off extremities of the tube ends and also to force the cut off extremities to drop into the hopper, the protruding extremities of the tube ends outstanding from the clamps bear during the cutting operation against two horizontal arms 45, 46 which keep them in line with the parts held in the clamps. The knives pass between these arms and the front of the clamps. The arms are therefore so disposed as to leave sufficient space for the free passage of the knives past them.

As soon as the tube end extremities have been cut off, the arms 45, 46 rise and the reciprocatable clamp approaches the stationary clamp to the point at which the cut surfaces, made adhesive by the heat of the knives, come in contact. Up to this moment in the traverse of the reciprocatable clamp, the surfaces to be spliced are held firmly all round by means of the fillets and blocks of the clamp and therefore they cannot but come into contact in the most suitable position to assure the continuity of the spliced tube walls.

During the further movement (i. e. in the forward direction) of the reciprocatable clamp, the fillets and blocks of both of the clamps are pushed into the interior thereof. It follows that, although the box virtually formed around the splice of the tube remains closed during the further movement aforesaid, the interior space of the box is considerably reduced and the rubber enclosed therewithin is subjected to compression which imparts to the splice a maximum measure of compactness.

On account of the fact that as the fillets recede into the interior spaces of the clamps they also move away from one another slightly in the plane of the splice of the tube ends, the rubber is forced in the immediate neighbourhood of the splice to accumulate as shown in Figure 10, so increasing the thickness of the tube wall along the line of the splice and therefore its resistance to rupture.

It will be understood that whilst the particular embodiment of the invention described above and shown in the drawings represents a preferred form thereof, the invention is susceptible to considerable variation as regards constructional details. For example, the form of the clamps may vary, as also may the form of the mechanism by which they are opened and closed and similarly the form of the mechanism for producing the relative movement of the clamps towards and away from one another. The constructional form of the knife mechanism and of its operating mechanism may also be different from that described above and shown in the drawings. All such variations are to be understood as within the scope of the invention as delineated in the following statements of claim.

What I claim as my invention and desire to secure by Letters Patent of the United States is:

1. An entirely power operated machine for butt-splicing two crude rubber tube ends, comprising (A) a pair of mutually opposed clamps in which the tube ends are placed with their respective extremities protruding towards one another from the front of the corresponding clamp, at least one of which clamps is movable towards and away from the other once per cycle of operation of the machine, said clamps comprising in each case two complementary halves, an upper half and a lower half, at least one of which is movable towards and away from the other to close and open the clamp (B) means for automatically closing the clamps upon the tube ends as a first phase in said cycle and automatically opening them as a later phase therein; (C) a pair of knives in juxtaposition respectively to the clamps, said knives being operable with reciprocatory movement and subsequently to closure of the clamps, to cut off the protruding extremities of the tube ends, the arrangement being such that at the end of an initial portion of the forward movement of the movable clamp towards the opposite clamp the freshly cut edges of the tube ends are brought into contact with one another and during the remaining portion of said forward movement the tube ends are compressed together into bonded connection to one another; (D) means for reciprocating the knives; (E) means for reciprocating the movable clamp towards and away from the opposite clamp, the arrangement being further such that the operative movements of the movable clamp, the movable clamp halves and the knives are all reciprocatory movements whose accelerations and decelerations are predetermined to suit the requirements of the butt-splicing operation in hand; (F) a constant speed power driven main drive shaft; and (G) an all-mechanical drive transmission operatively connecting the drive shaft to the parts B, D and E, said drive transmission consisting of three rotary cams associated respectively with the parts B, D and E and all driven by said shaft, and three associated lever and link systems intervening between the cams and the parts B, D and E, said lever and link systems constituting in each case the sole intermediary of drive between the relative cam and the part B, D or E and said cams being profiled to give the predetermined accelerations and decelerations aforesaid.

2. A machine as specified in claim 1, wherein the lever and link system associated with the cam allocated to the opening and closing of the clamps forms in respect of each clamp a toggle effective progressively to increase the closing thrust applied to the movable clamp half to a maximum reached at completion of closure of the clamp.

3. A machine as specified in claim 1, wherein the clamps are closed by thrust from the cam and opened by thrust from an elastic member which becomes loaded by thrust from the cam during the closure of the clamp.

4. A machine as specified in claim 1, wherein the lever and link system associated with the cam allocated to the opening and closing of the clamps forms in respect of each clamp a toggle effective progressively to increase the closing thrust applied to the movable clamp half to a maximum reached at completion of closure of the clamp, said closing thrust being transmitted through a pre-loaded elastic member.

5. A machine as specified in claim 1, wherein the lever and link system associated with the cam allocated to the opening and closing of the clamps forms in respect of each clamp a toggle effective progressively to increase the closing thrust applied to the movable clamp half to a maximum reached at completion of closure of the clamp, said closing thrust being transmitted through a pre-loaded elastic member having means for varying its degree of pre-loading at will.

6. A machine as specified in claim 1, wherein the path of movement of the movable clamp half towards and away from the other clamp half is rectilinear and perpendicular to the general plane of the tube end receiving space between the clamp halves.

7. A machine as specified in claim 1, wherein the lever and link system associated with the cam allocated to the movement of the movable clamp towards and away from the opposite clamp forms a toggle effective to increase the operative thrust upon the movable clamp during the movement thereof towards the opposite clamp to a maximum reached at the completion of said movement towards the opposite clamp.

8. A machine as specified in claim 1, wherein the movable clamp is moved in the direction towards the opposite clamp by thrust from the associated cam and away from said opposite clamp by thrust from an elastic member which becomes loaded by thrust from the cam during said movement of the clamp towards the opposite clamp.

9. A machine as specified in claim 1, wherein the movable clamp is moved in the direction towards the opposite clamp by thrust from the associated cam and away from said opposite clamp by thrust from an elastic member which becomes loaded by thrust from the cam during said movement of the clamp towards the opposite clamp, the thrust first mentioned being transmitted through a pre-loaded elastic member.

10. A machine as specified in claim 1, wherein the movable clamp is moved in the direction towards the opposite clamp by thrust from the associated cam and away from said opposite clamp by thrust from an elastic member which becomes loaded by thrust from the cam during said movement of the clamp towards the opposite clamp, the thrust first mentioned being transmitted through a pre-loaded elastic member having means for varying its degree of pre-loading at will to vary the pressure of the clamps against one another during the final portion of the movement of the movable clamp towards the opposite clamp.

11. A machine as specified in claim 1, wherein the path of movement of the movable clamp towards and away from the opposite clamp is arcuate, the said movement being about a fixed centre.

12. A machine as specified in claim 1, wherein the main drive shaft is driven by an electric motor forming part of the machine.

13. A machine as specified in claim 1, wherein each half of each clamp comprises a body portion carrying a clamping face against which the tube end is clamped, said clamping face being chamfered along the edge thereof towards the front of the body portion; a fillet at the front of the body portion slidable inwardly and outwardly thereof from a normal (machine at rest) position in which its forward end projects slightly beyond the front of the body portion, and a returning spring housed in the body portion and against which the fillet moves in sliding inwardly of the body portion, said fillet being slidable along a guide surface in the body portion which is slightly inclined to said clamping face, the face of the fillet which is towards the tube end being in sliding contact with this surface and its marginal portion at the outer (front) end of the fillet lying in the plane of the clamping face when the fillet is in said normal position, the arrangement being such therefore that as the fillet moves inwardly relatively to the body portion said marginal portion gradually recedes from said plane of the clamping face, the arrangement further being such that said inward movement of the fillet takes place during the remaining portion of the forward movement of the movable clamp towards the opposite clamp following the initial portion of said movement and is the result of pressure from the corresponding fillet of the opposite clamp, the fillets in the two clamps first coming into abutment with one another at the end of said initial portion and then each pressing the other into the body portion of the respective clamp against the opposing thrust of the returning spring, and the arrangement further being such that during said inward movement of the fillet the space bounded on one side by the tube end in position in the clamp and on the other partly by the chamfer of the clamping face and partly by the portion of said face of the fillet which in the normal position thereof projects beyond the clamping face, becomes merged more and more with the corresponding space of the opposite clamp until eventually the two spaces form together a recess of triangular cross-section extending across the tube ends along the line of the splice, said recess being completely filled with rubber from the tube ends which has flowed into it under the pressure of the clamps so as to form a local thickening of the tube wall along said line of the splice.

14. A machine as specified in claim 1, wherein (a) each half of each clamp comprises a body portion carrying a clamping face against which the tube end is clamped, said clamping face being chamfered along the edge thereof towards the front of the body portion; a fillet at the front of the body portion slidable inwardly and outwardly thereof from a normal (machine at rest) position in which its forward end projects slightly beyond the front of the body portion, and a returning spring housed in the body portion and against which the fillet moves in sliding inwardly of the body portion, said fillet being slidable along a guide surface in the body portion which is slightly inclined to said clamping face, the face of the fillet which is towards the tube end being in sliding contact with this surface and its marginal portion at the outer (front) end of the fillet lying in the plane of the clamping face when the fillet is in said normal position, the arrangement being such therefore that as the fillet moves inwardly relatively to the body portion said marginal portion gradually recedes from said plane of the clamping face, the arrangement further being such that said inward movement of the fillet takes place during the remaining portion of the forward movement of the movable clamp towards the opposite clamp following the initial portion of said movement and is the result of pressure from the corresponding fillet of the opposite clamp, the fillets in the two clamps first coming into abutment with one another at the end of said initial portion and then each pressing the other into the body portion of the respective clamp against the opposing thrust of the returning spring, and the arrangement further being such that during said inward movement of the fillet the space bounded on one side by the tube end in position in the clamp and on the other partly by the chamfer of the clamping face and partly by the portion of said face of the fillet which in the normal position thereof projects beyond the clamping face, becomes merged more and more with the corresponding space of the opposite clamp until eventually the two spaces form together a recess of triangular cross-section extending across the tube ends along the line of the splice, said recess being completely filled with rubber from the tube ends which has flowed into it under the pressure of the clamps so as to form a local thickening of the tube wall along said line of the splice, and (b) each clamp further comprises a pair of blocks which are carried on one of the clamp halves in such positions therein as to lie along the folds of the tube end in position in the closed clamp, as regards the portion thereof which projects beyond the front of the body portions of the clamp, thereby supporting said folds laterally of the tube end during the operation of the knife mechanism and throughout the movement of the movable clamp towards the opposite clamp, said blocks being movable inwardly and outwardly of the body portion in unison with the fillets of the clamp and as the result of pressure from the blocks of the opposite clamp, against a returning spring housed in the body portion.

15. A machine as specified in claim 1, wherein (a) each half of each clamp comprises a body portion carrying a clamping face against which the tube end is clamped, said clamping face being chamfered along the edge thereof towards the front of the body portion; a fillet at the front of the body portion slidable inwardly and outwardly thereof from a normal (machine at rest) position in which its forward end projects slightly beyond the front of the body portion, and a returning spring housed in the body portion and against which the fillet moves in sliding inwardly of the body portion, said fillet being slidable along a guide surface in the body portion which is slightly inclined to said clamping face, the face of the fillet which is towards the tube end being in sliding contact with this surface and its marginal portion at the outer (front) end of the fillet lying in the plane of the clamping face when the fillet is in said normal position, the arrangement being such therefore that as the fillet moves inwardly relatively to the body portion said marginal portion gradually recedes from said plane of the clamping face, the arrangement further being such that said inward movement of the fillet takes place during the remaining portion of the forward movement of the movable clamp towards the opposite clamp following the initial portion of said movement and is the result of pressure from the corresponding fillet of the opposite clamp, the fillets in the two clamps first coming into abutment with one another at the end of said initial portion and then each pressing the other into the body portion of the respective clamp against the opposing thrust of the returning spring, and the arrangement further being such that during said inward movement of the fillet the space bounded on one side by the tube end in position in the clamp and on the other partly by the chamfer of the clamping face and partly by the portion of said face of the fillet which in the normal position thereof projects beyond the clamping face, becomes merged more and more with the corresponding space of the opposite clamp until eventually the two spaces form together a recess of triangular cross-section extending across the tube ends along the line of the splice, said recess being completely filled with rubber from the tube ends which has flowed into it under the pressure of the clamps so as to form a local thickening of the tube wall along said line of the splice, (b) the knives are of planar form and (c) in the case of each clamp the plane of cut of the corresponding knife is parallel and close to the plane of the front faces of the fillets when these are in their normal (outward) positions.

16. A machine as specified in claim 1, wherein the knives are of planar form and operate with a shearing action and the protruding extremities of the tube ends are supported during the action of the knives upon them by arms in stationary relation to the clamps located close to the paths of the knives on the side thereof remote from the front of the clamp, the said extremities being in each case devoid of support during said action where they extend across the gap between the front of the clamp and the associated arm.

17. A machine as specified in claim 1, wherein the knives are of planar form, operate with a shearing action and are disposed with their cutting edges at an angle to the general plane of the tube end in position in the clamp and the protruding extremities of the tube ends are supported during the action of the knives upon them by arms in stationary relation to the clamps located close to the paths of the knives on the side thereof remote from the front of the clamp, the said extremities being in each case devoid of support during said action where they extend across the gap between the front of the clamp and the associated arm.

18. A machine as specified in claim 1, wherein the knives are of planar form, operate with a shearing action and are disposed with their cutting edges at an angle to the general plane of the tube end in position in the clamp and the protruding extremities of the tube ends are supported during the action of the knives upon them by arms in stationary relation to the clamps located close to the paths of the knives on the side thereof remote from the front of the clamp, the said extremities being in each case devoid of support during said action where they extend across the gap between the front of the clamp and the associated arm, the knives being so mounted as to enable their paths where these pass the front of the associated clamp to be adjusted at will towards and away from the clamp.

19. A machine as specified in claim 1, wherein the knives are of planar form, operate with a shearing action and are disposed with their cutting edges at an angle to the general plane of the tube end in position in the clamp and the protruding extremities of the tube ends are supported during the action of the knives upon them by arms in stationary relation to the clamps located close to the paths of the knives on the side thereof remote from the front of the clamp, the said extremities being in each case devoid of support during said action where they extend across the gap between the front of the clamp and the associated arm, the knives being so mounted as to enable their cutting edges to be adjusted at will to perfect parallelism with the plane of the front of the associated clamp.

References Cited in the file of this patent

UNITED STATES PATENTS

| Number | Name | Date |
|---|---|---|
| 2,024,578 | Haase | Dec. 17, 1935 |
| 2,186,286 | Engler et al. | Jan. 9, 1940 |
| 2,272,881 | Stevens | Feb. 10, 1942 |
| 2,273,463 | Campbell et al. | Feb. 17, 1942 |
| 2,541,696 | George | Feb. 13, 1951 |
| 2,561,019 | George | July 17, 1951 |